(12) United States Patent
Huang

(10) Patent No.: US 7,086,072 B2
(45) Date of Patent: Aug. 1, 2006

(54) SPINDLE MOTOR HAVING MOUNTING PLATE WITH SPACE FOR CONNECTING AND HAVING CIRCUIT BOARD COVERED BY ROTOR FOR A SLIM OPTICAL DISK APPARATUS

(75) Inventor: Chienyi Huang, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 382 days.

(21) Appl. No.: 10/751,180

(22) Filed: Dec. 31, 2003

(65) Prior Publication Data
US 2005/0022220 A1 Jan. 27, 2005

(30) Foreign Application Priority Data
Jul. 25, 2003 (TW) ................ 92213575 U

(51) Int. Cl.
*G11B 15/30* (2006.01)
(52) U.S. Cl. .................................... 720/697
(58) Field of Classification Search ............... 720/697, 720/695, 658; 360/99.04, 98.07, 245.9; 369/258.1, 369/263.1, 264, 270.1
See application file for complete search history.

(56) References Cited

U.S. PATENT DOCUMENTS

| 5,572,384 | A | * | 11/1996 | Kumagai et al. | ........ 360/99.08 |
| 5,923,110 | A | * | 7/1999 | Zhao et al. | .................... 310/91 |
| 6,204,583 | B1 | * | 3/2001 | Sasaki et al. | ................. 310/91 |
| 2001/0053040 | A1 | * | 12/2001 | Sekine | ..................... 360/97.01 |
| 2003/0039060 | A1 | * | 2/2003 | Komatsu et al. | ......... 360/99.04 |
| 2004/0037007 | A1 | * | 2/2004 | Rugg et al. | .............. 360/245.9 |

* cited by examiner

*Primary Examiner*—Julie Anne Watko
(74) *Attorney, Agent, or Firm*—Han-Yi Lee; Bayshorepatent Patent Group, LLC

(57) ABSTRACT

The spindle motor for a slim optical disk apparatus has a stator, a rotor, a circuit board, and a mounting plate. The circuit board is within the range covered by the rotor and has a plurality of electronic components used on the spindle motor and a plurality of electric contacts for connecting an external connecting piece. The mounting plate is used at least for fixing the circuit board and has an area in correspondence by position with the electric contacts of the circuit board, wherein the area provides a space required for connecting of the electric contacts with the external connecting piece.

10 Claims, 6 Drawing Sheets

SPINDLE MOTOR HAVING MOUNTING PLATE WITH SPACE FOR CONNECTING AND HAVING CIRCUIT BOARD COVERED BY ROTOR FOR A SLIM OPTICAL DISK APPARATUS

FIELD OF THE INVENTION

The present invention is related to a spindle motor, and especially to a spindle motor for a slim optical disk apparatus.

BACKGROUND OF THE INVENTION

FIG. 1 shows the structure of a conventional spindle motor. The spindle motor 1 of the prior art mainly comprises a rotor 11, a stator 13, a circuit board 15 and a mounting plate 17, wherein the circuit board 15 includes a plurality of electronic components 15a and electric contacts 15b. The spindle motor 1 must use an external connecting piece 3 such as a cable to electrically connect with the plural electric contacts 15b, so that electric signals can go through the external connecting piece 3, the plural electric contacts 15b and the electronic components 15a for changing the electromagnetic fields of the stator 13 to rotate the rotor 11. By the fact that the circuit board 15 is made to the scale of a large area in pursuance of the scope covered by the rotor 11 and the stator 13, and it allows a part thereof with the electric contacts 15b to protrude to quite a degree, however, the circuit board 15 of the conventional spindle motor 1 of such a structure occupies quite a large space, therefore, the conventional spindle motor 1 of such a structure is hard to meet the requirement of being light, thin, and small.

In view of the above stated defects of the prior art, the inventor of the present invention tried hard to figure out an improvement and thus developed a spindle motor for a slim optical disk apparatus; the improved spindle motor of the present invention has the feature of being light, thin, and small, so that miniaturization of optical disk apparatuses can be more easily realized.

SUMMARY OF THE INVENTION

The object of the present invention is to provide a spindle motor for a slim optical disk apparatus, by the structural improvement of the spindle motor of the present invention, optical disk apparatuses can more easily realize their requirement of being light, thin, and small.

To get the above object, the present invention provides a spindle motor for a slim optical disk apparatus, it comprises: a stator; a rotor; a circuit board being within the range covered by the rotor, the circuit board having a plurality of electronic components used on the spindle motor and a plurality of electric contacts for connecting an external connecting piece; a mounting plate used at least for fixing the circuit board. Wherein the mounting plate has an area in correspondence by position with the electric contacts of the circuit board, the area provides a space required for connecting of the electric contacts with the external connecting piece.

The present invention will be apparent in its objects, feature as well as effects after reading the detailed description of the preferred embodiment thereof in reference to the accompanying drawings.

DETAILED DESCRIPTION OF THE INVENTION

Figure 1:
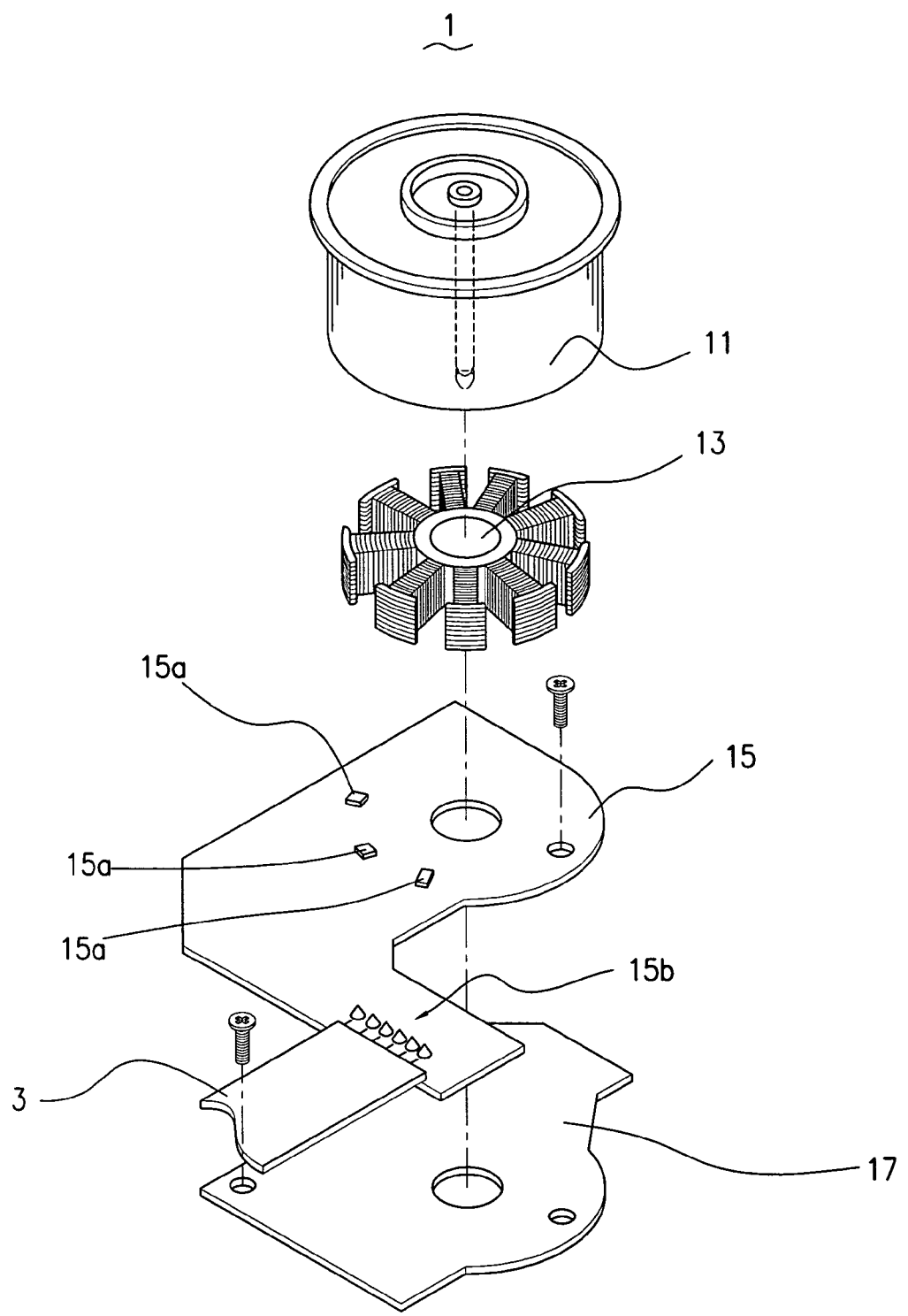
FIG. 1 is a perspective view showing the structure of a conventional spindle motor.

The spindle motor 2 of the present invention is used mainly in a slim optical disk apparatus. By the fact that data processing electronic devices such as a notebook, a tablet PC etc. are requested to be more and more light, thin, and small, the slim optical disk apparatus installed in such a electronic device must be requested to be more and more light, thin, and small in order that it will not occupy a too large space in the data processing electronic device. The spindle motor 2 of the present invention can meet the requirement of being light, thin, and small. And the spindle motor 2 of the present invention comprises: a rotor 21 which can be a rotor of a conventional structure; a stator 23 which can also be a stator of a conventional structure; a circuit board 25 being within the range covered by the rotor 21, the circuit board 25 having a plurality of electronic components 25a used on the spindle motor 2 and a plurality of electric contacts 25b for connecting an external connecting piece 3, the material of the circuit board 25 being the material generally for a printed circuit board (PCB); a mounting plate 27 used at least for fixing the circuit board 25, the mounting plate 27 being made of metallic or hard material, and having an area 27a in correspondence by position with the electric contacts 25b of the circuit board 25, the area 27a mainly providing a space required for connecting of the electric contacts 25b with the external connecting piece 3.

Figure 2A:
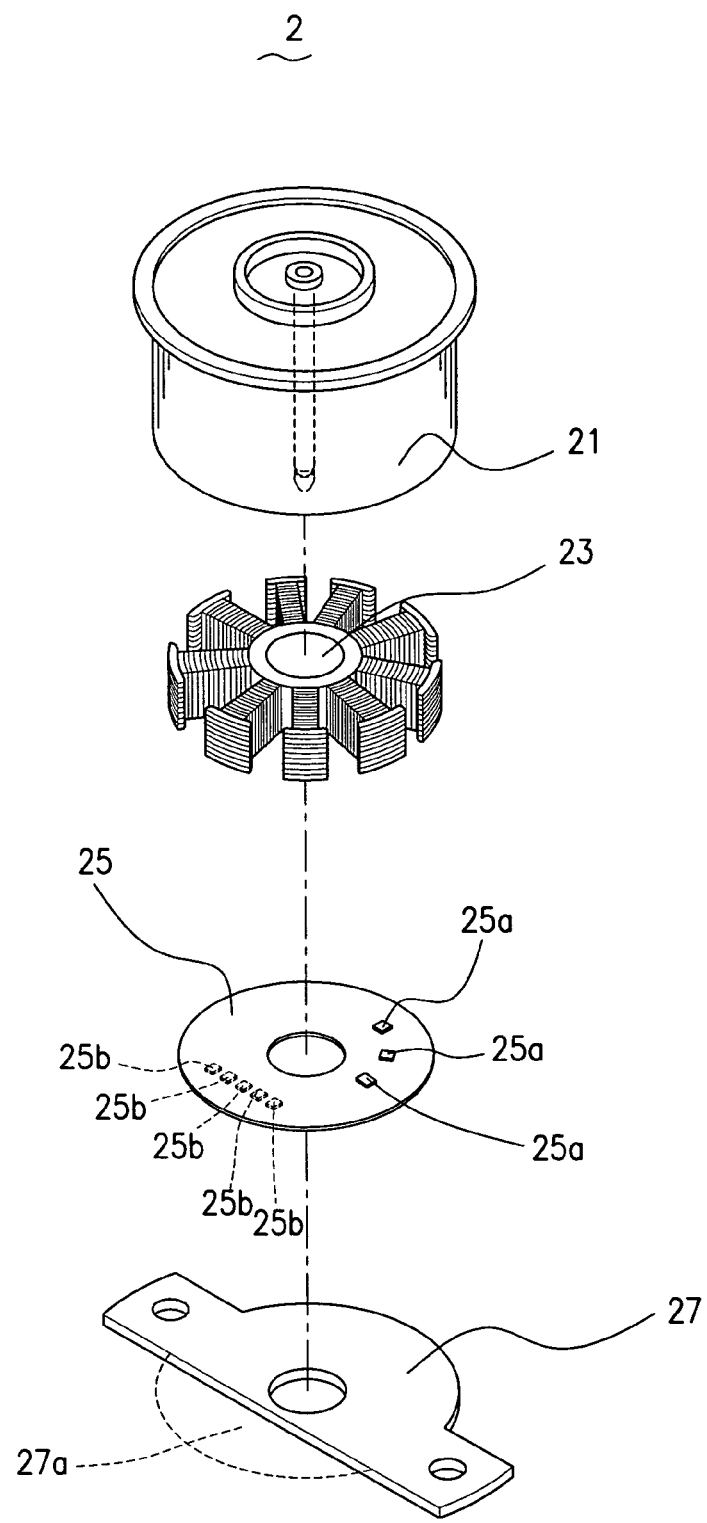
FIG. 2A is a perspective view of a first embodiment of a spindle motor of the present invention for a slim optical disk apparatus.

FIG. 2A shows a first embodiment of a spindle motor of the present invention for a slim optical disk apparatus. The spindle motor 2 of the first embodiment of the present invention has a vacant area 27a provided at the periphery of the mounting plate 27 which is corresponding by position to the electric contacts 25b of the circuit board 25. The external connecting piece 3 such as a cable or a flexible printed circuit can be subjected to soldering or some other electrical connecting way in the space of the vacant area 27a to contact the electric contacts 25b. The size of the circuit board 25 of the first embodiment is most preferably within the range covered by the rotor 21, i.e., the circuit board 25 had better not extend over the range covered by the rotor 21.

Figure 2B:
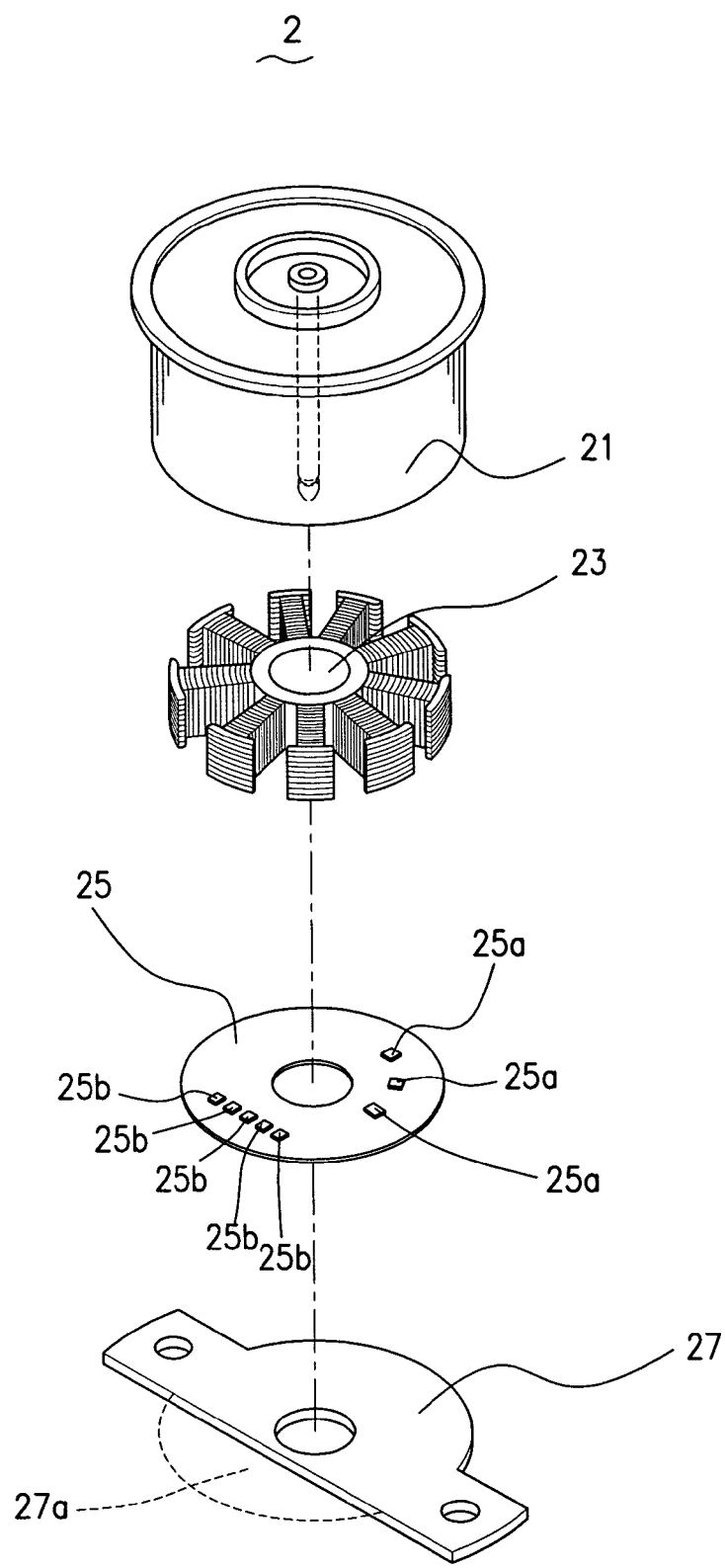
FIG. 2B is a perspective view of a modification of the first embodiment of the spindle motor of the present invention for a slim optical disk apparatus.

FIG. 2B shows a modification of the first embodiment of the spindle motor of the present invention for a slim optical disk apparatus. The main difference between the spindle motor 2 of FIG. 2B and the spindle motor 2 of FIG. 2A is only resided in the arranged position of their electric contacts 25b, the electric contacts 25b in FIG. 2A are disposed on the rear side of the circuit board 25, while the electric contacts 25b in FIG. 2B are disposed on the front side of the circuit board 25.

Figure 3:
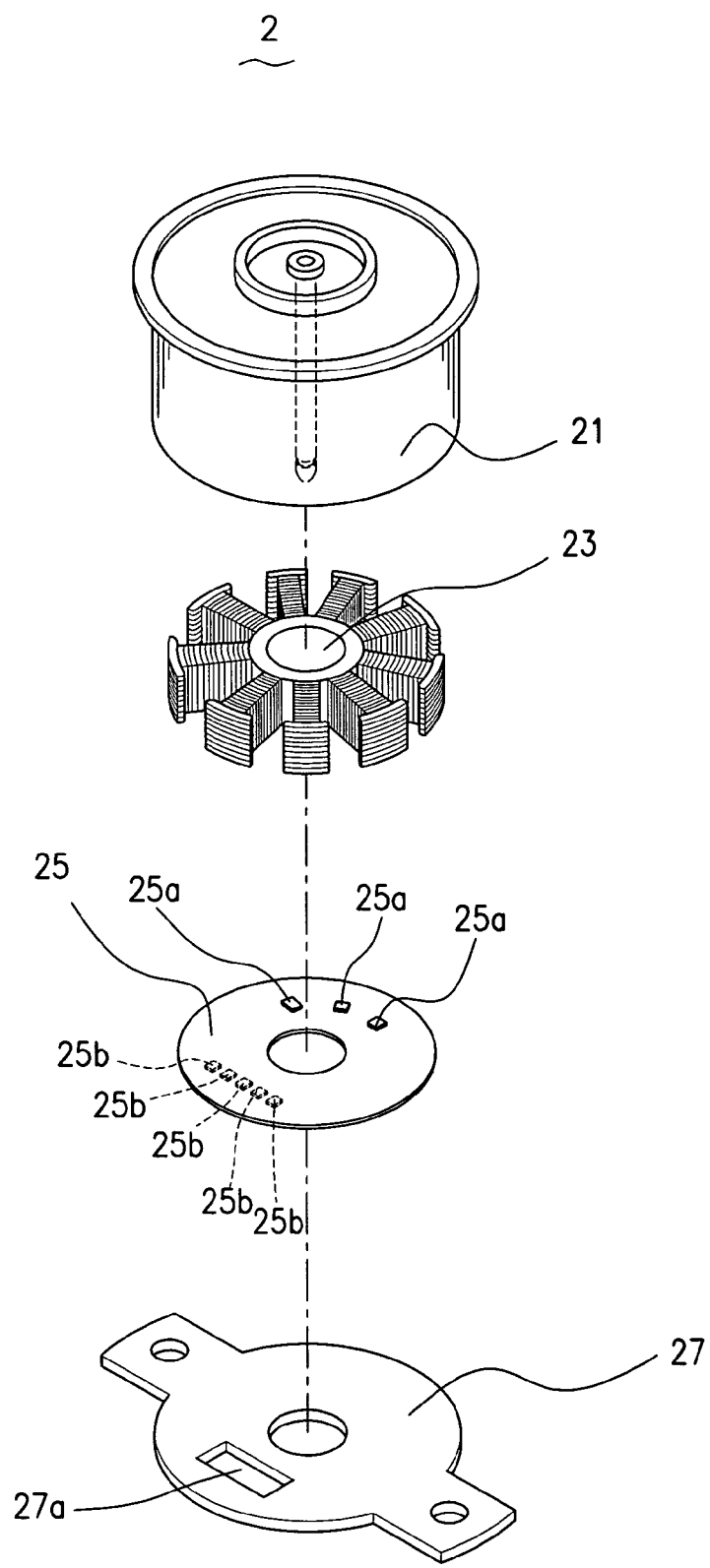
FIG. 3 is a perspective view of a second embodiment of the spindle motor of the present invention for a slim optical disk apparatus.

FIG. 3 shows a second embodiment of the spindle motor for a slim optical disk apparatus of the present invention. The spindle motor 2 of the second embodiment of the present invention has a vacant area 27a provided in the mounting plate 27 which is corresponding by position to the electric contacts 25b of the circuit board 25. The external connecting piece 3 such as a cable or a flexible printed circuit can be subjected to soldering or some other electrical connecting way in the space of the vacant area 27a to contact the electric contacts 25b. The size of the circuit board 25 of the second embodiment is most preferably within the range covered by the rotor 21 for the same reason as of the first embodiment, i.e., the circuit board 25 had better not extend over the range covered by the rotor 21.

Figure 4:
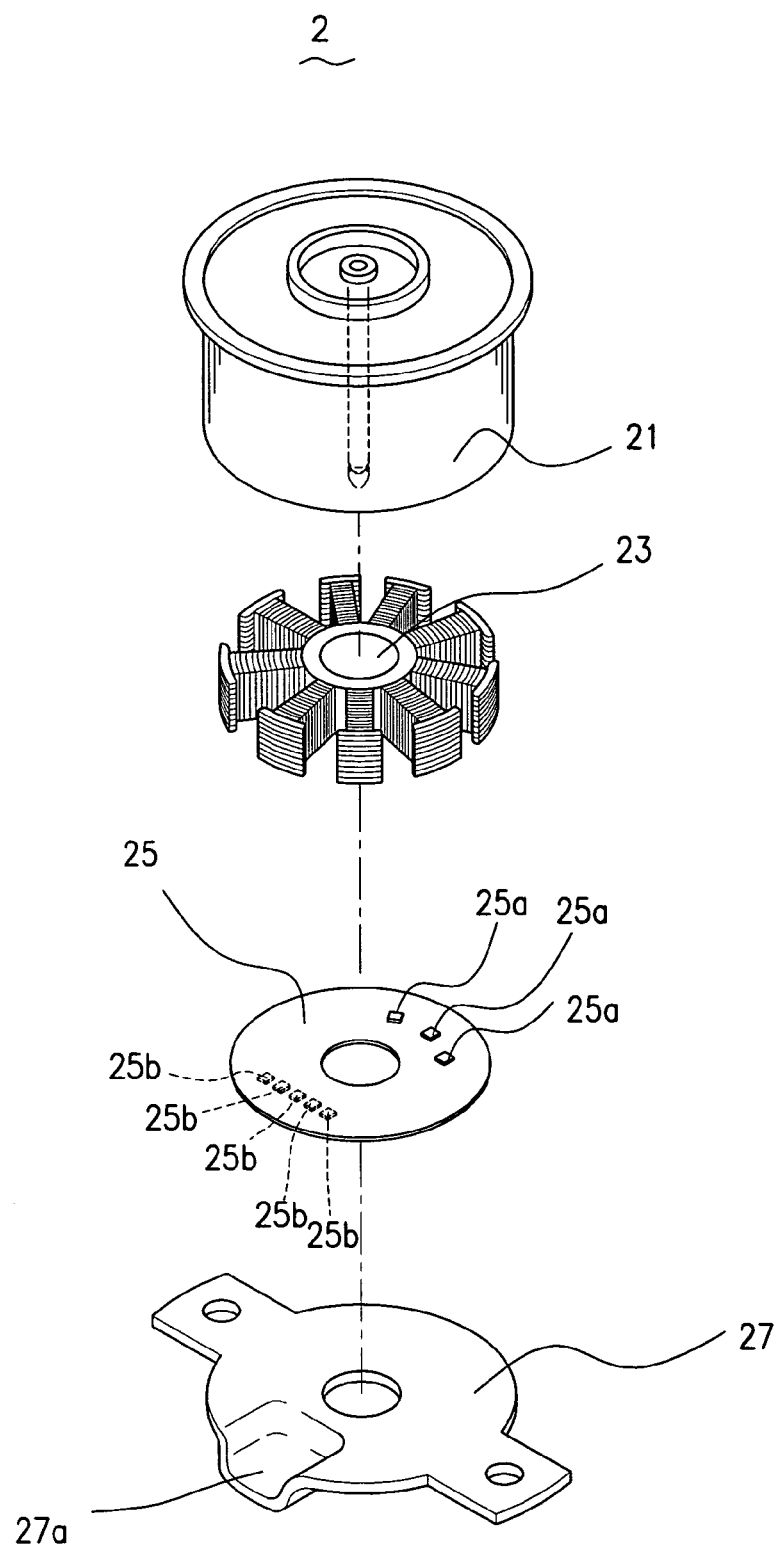
FIG. 4 is a perspective view of a third embodiment of the spindle motor of the present invention for a slim optical disk apparatus.

FIG. 4 shows a third embodiment of the spindle motor for a slim optical disk apparatus of the present invention. The spindle motor 2 of the third embodiment of the present invention has a raised area 27a provided on the periphery of the mounting plate 27 which is corresponding by position to the electric contacts 25b of the circuit board 25. The external connecting piece 3 such as a cable or a flexible printed circuit can be extended into in the space of the raised area 27a and to be subjected to soldering or some other electrical connecting way for contacting the electric contacts 25b to acquire the object of electric connecting. The size of the circuit board 25 of the third embodiment is most preferably within the range covered by the rotor 21 for the same reason as of the first embodiment, i.e., the circuit board 25 had better not extend over the range covered by the rotor 21.

Figure 5:
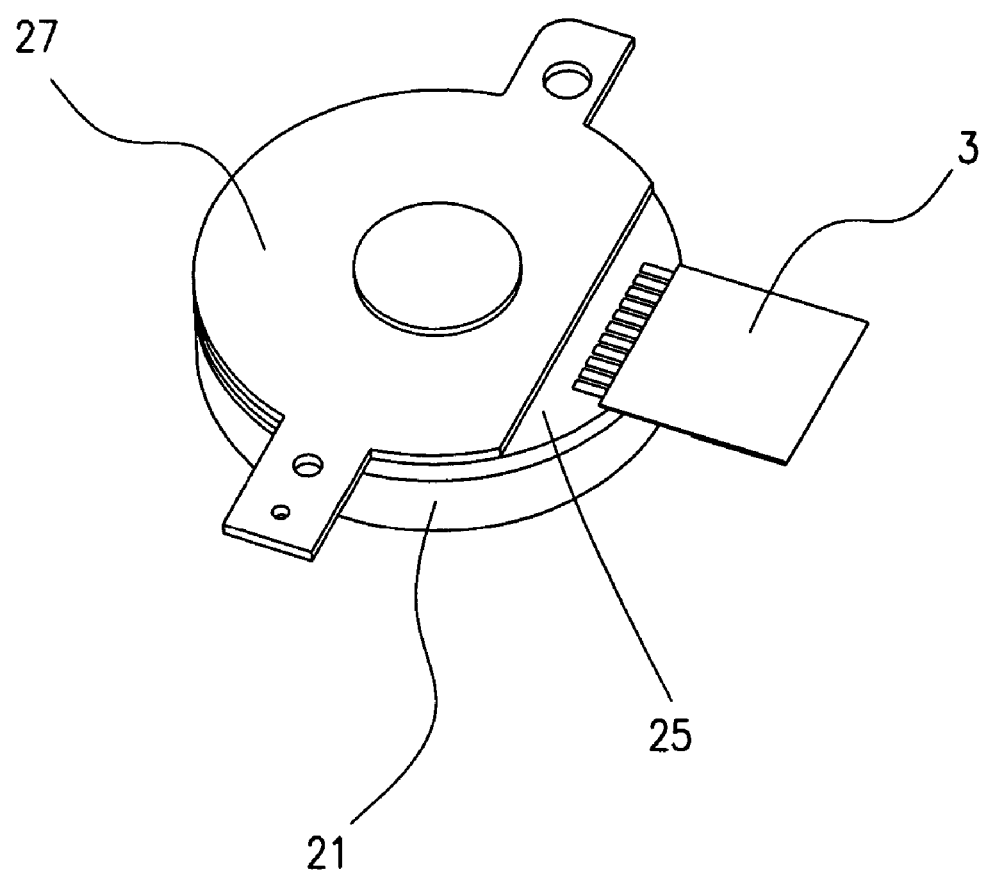
FIG. 5 is a perspective view showing the structure of connecting the first embodiment of the spindle motor for a slim optical disk apparatus of the present invention with an external connecting piece.

FIG. 5 is a perspective view showing the structure of connecting the first embodiment of the present invention with an external connecting piece. It can be clear from FIG. 5 that the vacant area 27a of the mounting plate 27 is used to make electric connection for the electric contacts 25b of the circuit board 25.

The volume of the entire spindle motor 2 of present invention has completely overcome the inferior factor resided in electric connecting of the external connecting piece 3 with the electric contacts 25b, with which factor, the circuit board 25 has to be extended out of the spindle motor 2, this will increase the entire volume. Thereby, the spindle motor 2 of present invention is extremely suitable for a slim optical disk apparatus with a thickness of 5–17 cm.

The first to the third embodiments of the present invention are described without the description of the measures of fixing of the circuit board 25 to the mounting plate 27, the present invention can have the circuit board 25 fixed to the mounting plate 27 by a conventional fixing means such as screws and screw holes.

It will be apparent to those skilled in this art that various modifications or changes can be made to the present invention without departing from the spirit and concept of this invention. Accordingly, all such modifications and changes also fall within the scope and concept of the appended claims.

What is claimed is:

1. A spindle motor for a slim optical disk apparatus, said spindle motor comprises:
   a stator;
   a rotor; and
   a circuit board being within the range covered by said rotor, said circuit board has a plurality of electronic components used on said spindle motor and a plurality of electric contacts for connecting an external connecting piece;
   a mounting plate used at least for fixing said circuit board, wherein said mounting plate has an area in correspondence by position with said electric contacts of said circuit board, said area provides a space required for connecting of said electric contacts with said external connecting piece.

2. The spindle motor for a slim optical disk apparatus as in claim 1, wherein said mounting plate is within said range covered by said rotor.

3. The spindle motor for a slim optical disk apparatus as in claim 1, wherein thickness of said slim optical disk apparatus for said spindle motor is 5–17 cm.

4. The spindle motor for a slim optical disk apparatus as in claim 1, wherein said mounting plate has a vacant area in correspondence by position with said electric contacts of said circuit board.

5. The spindle motor for a slim optical disk apparatus as in claim 4, wherein said vacant area is provided at the periphery of said mounting plate.

6. The spindle motor for a slim optical disk apparatus as in claim 4, wherein said vacant area is provided in said mounting plate.

7. The spindle motor for a slim optical disk apparatus as in claim 1, wherein said spindle motor has a raised area which is provided on the periphery of said mounting plate, said raised area is corresponding by position to said electric contacts of said circuit board.

8. A spindle motor for a slim optical disk apparatus, said spindle motor comprises:
   a stator;
   a rotor;
   a circuit board being within the range covered by said rotor, said circuit board has a plurality of electronic components used on said spindle motor and a plurality of electric contacts for connecting an external connecting piece; and
   a mounting plate used at least for fixing said circuit board, wherein said mounting plate has a vacant area provided at the periphery of said mounting plate, said vacant area is in correspondence by position with said electric contacts of said circuit board and provides a space required for connecting of said electric contacts with said external connecting piece.

9. A spindle motor for a slim optical disk apparatus, said spindle motor comprises:
   a stator;
   a rotor;
   a circuit board being within the range covered by said rotor, said circuit board has a plurality of electronic components used on said spindle motor and a plurality of electric contacts for connecting an external connecting piece; and
   a mounting plate used at least for fixing said circuit board, wherein said mounting plate has a vacant area provided in said mounting plate, said vacant area is in correspondence by position with said electric contacts of said circuit board and provides a space required for connecting of said electric contacts with said external connecting piece.

10. A spindle motor for a slim optical disk apparatus, said spindle motor comprises:
   a stator;
   a rotor;
   a circuit board being within the range covered by said rotor, said circuit board has a plurality of electronic components used on said spindle motor and a plurality of electric contacts for connecting an external connecting piece; and
   a mounting plate used at least for fixing said circuit board, wherein said mounting plate has a raised area which is provided on the periphery of said mounting plate, said raised area is in correspondence by position with said electric contacts of said circuit board and provides a space required for connecting of said electric contacts with said external connecting piece.

* * * * *